United States Patent [19]

Kumar et al.

[11] Patent Number: 4,494,726
[45] Date of Patent: Jan. 22, 1985

[54] CONTROL VALVE

[75] Inventors: Viraraghavan S. Kumar; Rohn L. Olson, both of Waterloo, Iowa

[73] Assignee: Deere & Company, Moline, Ill.

[21] Appl. No.: 520,925

[22] Filed: Aug. 8, 1983

[51] Int. Cl.³ ................... F16K 31/02; F16K 31/102
[52] U.S. Cl. ..................................... 251/29; 251/30; 251/44
[58] Field of Search ............................. 251/29, 30, 44

[56] References Cited
U.S. PATENT DOCUMENTS
4,201,362  5/1980  Nishimi et al. ................. 251/29

Primary Examiner—James C. Yeung

[57] ABSTRACT

A solenoid-operated control valve has a main orifice and a valve member for controlling fluid flow therethrough. A leakage orifice extends through the valve member. A check valve seals the leakage orifice when the main orifice is blocked and moves to open the leakage orifice before the main orifice is opened.

8 Claims, 2 Drawing Figures

CONTROL VALVE

BACKGROUND OF THE INVENTION

The present invention relates to a solenoid-operated, poppet-type orifice control valve.

Poppet-type valves have traditionally been used as on/off valves or for pressure control, while spool valves have been traditionally used for precision control. However, since poppet-type valves are less prone to contamination, there is a desire to use poppet-type valves for precision control as well.

An example of a poppet-type control valve is found in U.S. Pat. No. 3,893,471 issued to Byers, Jr. in 1975. Such valves have a pressure balancing pin which is used to cancel out the effects of load due to pressure on the main orifice control valve, thus making the valve insensitive to load variations. However, in such a valve, when its solenoid is off, there is a fluid leakage path from inlet to outlet between the pressure balancing pin and the armature. Such leakage is acceptable when the solenoid is "on" and the valve is open. However, when the solenoid is off, such leakage can lead to "drift" of the actuator or device controlled by the valve. Therefore, it would be desirable to have a poppet-type control valve wherein such leakage is prevented when the valve is closed.

SUMMARY OF THE INVENTION

A general object of this invention is to provide a control valve for precisely controlling fluid flow between an inlet and an outlet.

Another object of the present invention is to provide a control valve which is less prone to contamination than are spool valves.

Another object of the present invention is to provide a solenoid-operated, poppet-type orifice control valve wherein leakage flow is prevented when the valve is closed, but permitted when open.

These and other objects are achieved by the present invention wherein a solenoid-operated control valves has an inlet, an outlet, a movable valve member for controlling fluid flow through a main orifice, a hollow armature for moving the valve member and a pressure balancing pin movable within the armature. A leakage orifice in the valve member communicates to the main orifice leakage fluid which can flow between the armature and the pressure balancing pin. A leakage check valve is movable in a chamber formed between the valve member and the armature. When the valve member is closed, a pressure differential moves the check valve to seal against and close the leakage orifice. When the solenoid is energized, the check valve is moved to open the leakage orifice before the valve member moves to open the main orifice.

DETAILED DESCRIPTION

Figure 1:
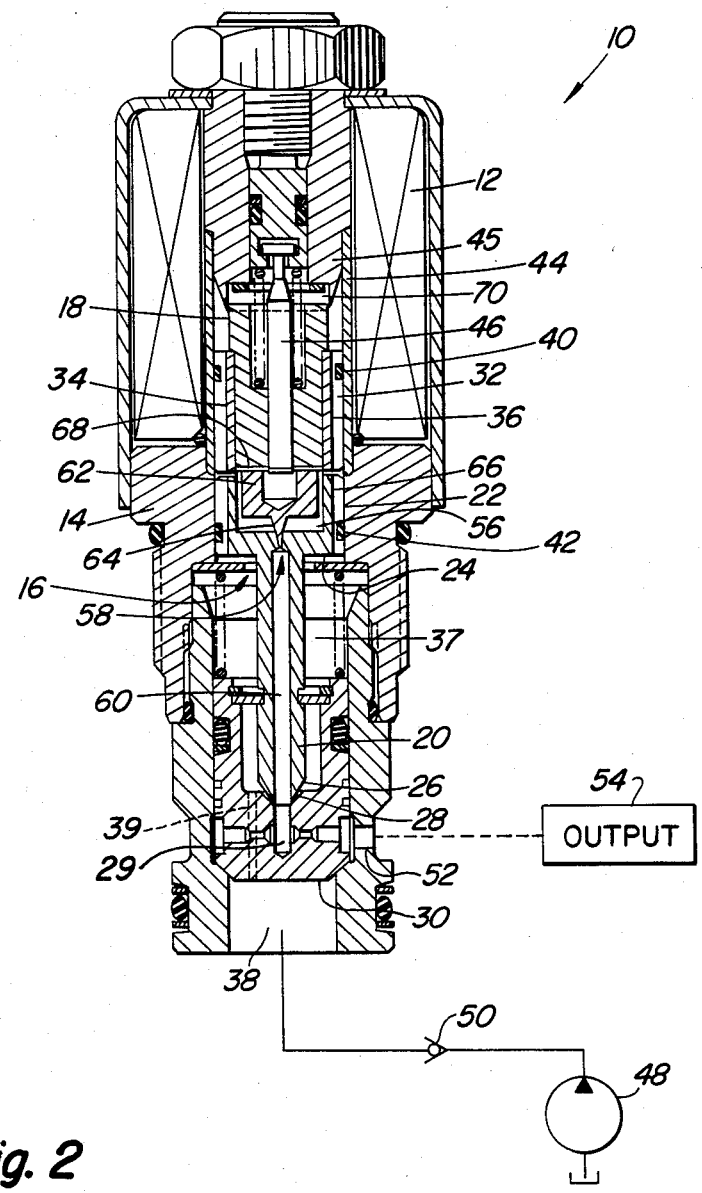
FIG. 1 is a sectional view of a solenoid-operated control valve constructed according to the present invention.
Figure 2:
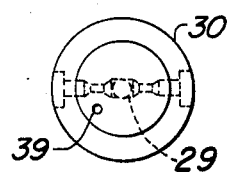
FIG. 2 is a sectional view of the orifice member of FIG. 1.

A solenoid-operated orifice control valve 10 includes a coil 12 and a housing 14 surrounding a valve member 16 and an armature 18. The valve member 16 is preferably constructed of magnetic steel and has a hollow stem 20 joined to a hollow sleeve portion 22 by a radial wall 24. Stem 20 has a tapered end 26 which is engageable with a main valve seat 28 which surrounds one end of a passage 29 in poppet 30 to control fluid flow therethrough. Preferably, a stainless steel tube 32 is welded to the end of sleeve portion 22. The tube 32 and portion 22 have a pair of axially extending slots 34 and 36 on opposite sides thereof to permit fluid flow from inlet chamber 38 to the upper end of armature 18 via passage 39 and chamber 37. Armature suspension rings 40 and 42 of "Teflon" and glass are located in grooves and act as spaces to allow free movement of tube 32 and valve member 16 within a non-magnetic bearing sleeve 44. The hollow magnetic steel armature 18 is tight-fitted into the tube 32. A pressure balancing pin 46 is slidably received by the armature 18. The bearing sleeve 44 is welded to the outer surface of pole piece 45 and to the inner surface of housing 14.

The inlet chamber 38 receives fluid from pump 48 via check valve 50. An outlet 52 communicates fluid to an output device 54. The valve member 16, the tube 32 and the armature 18 enclose a chamber 56. An isolation passage or leakage orifice 58 extends through the wall 24 of valve member 16 and communicates chamber 56 with the passage 29 via passage 60 which extends through stem 20.

An isolation or check valve member 62 is located in the chamber 56 and includes a conical projection or sealing tip 64 for sealing engagement with wall 24 surrounding isolation passage 58. Axially extending slots 66 in the surface of check valve member 62 prevent pressure build-up from restricting the free movement of valve member 62 within chamber 56.

When solenoid coil 12 is not energized, the main orifice 28 is closed by the end 26 of stem 20 and passage 60 will be at low pressure. At the same time, chamber 56 will be receiving higher pressure leakage fluid from inlet chamber 38 via passage 39 in poppet 30 and via slots 34 and 36 and leakage flow between the armature 18 and pin 46. This pressure differential causes check valve member 62 to move downward, viewing the figure, to seal leakage passage 58 and prevent leakage flow out of the control valve 10 when its solenoid is turned off. Note that there is an axially extending gap 68 separating the check valve member 62 from the armature 18. There is also a gap 70 separating the armature 18 from magnetic pole piece 45 of the solenoid. Preferably, the various components of this invention are constructed so that when the coil 12 is not energized, the gap 70 is larger than gap 68. Thus, when coil 12 is energized, check valve 62 will be pulled away to open leakage passage 58 before passage 29 is opened. In this manner, communication between chamber 56 and passage 29 is opened to permit leakage flow around pressure balancing pin 46 so that pin 46 can function properly when the control valve 10 is opened.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a servo-operated control valve having a housing defining an inlet and an outlet, a poppet movable in the housing to control fluid communication between the inlet and the outlet, the poppet having a first passage extending therethrough and communicating with the outlet and a first valve seat surrounding an end of the first passage, the control valve also having a hollow main valve member movable in the housing and cooperating with the first valve seat to control fluid communication through the first passage, the valve member having a second passage extending therethrough, the control valve also having a hollow armature member movable in response to operation of the servo to move the valve member, and a pressure-balancing pin movably received by the armature for balancing hydraulic forces acting upon the armature and valve members, the first and second passages forming a flow path to the outlet for fluid which leaks past the pressure-balancing pin, the improvement wherein:

a check valve seat surrounds one of the second passage and is spaced apart from the first valve seat; and
   a check valve member is located between the armature and the valve member and is movable in response to a pressure differential between the inlet and the outlet to a first position sealingly engaging the check valve seat to block leakage flow from the inlet to the first and second passages and to a second position spaced apart from the check valve seat to permit leakage flow from the inlet to the first and second passages.

2. The invention of claim 1, wherein:
in response to operation of the servo, the check valve member moves away from the second valve seat before the valve member moves away from the first valve seat.

3. The invention of claim 1, wherein the control valve further comprises:
   a magnetic core element separated from the armature member by a first gap when the main valve member engages the first seat, the check valve member being separated from the armature member by a second gap when both seats are engaged, the first gap being larger than the second gap.

4. A solenoid-operated valve comprising:
   a housing having an inlet and an outlet;
   a poppet member movable in the housing to control fluid communication between the inlet and the outlet, the poppet member having a first passage extending therethrough and communicated with the outlet and a second passage extending therethrough and communicated with the inlet, a surface of the poppet member forming a first valve seat surrounding one end of the first passage;
   a hollow valve member movable in the housing and cooperating with the first valve seat to control fluid flow from the inlet to the outlet via the first passage, the valve member having a third passage extending therethrough and a second valve seat surrounding one end of the third passage;
   a hollow armature member movable in response to energization of the solenoid to move the valve member, the armature and valve members defining a chamber therebetween, the chamber being communicated with the inlet and being communicated with the one end of the third passage;
   a pressure balancing pin movable within the armature and having an end exposed to fluid pressure in the chamber, the pressure-balancing pin being operable to balance hydraulic forces acting upon the armature and valve members, the first and third passages forming a flow path to the outlet for fluid which leaks past the pressure-balancing pin; and
   a check valve movable in the chamber to a first position engaging the second seat to block leakage fluid flow from the chamber to the outlet via the first and third passages and to a second position spaced apart from the second seat to permit fluid flow from the chamber to the outlet via the first and third passages.

5. The invention of claim 4, wherein the valve further comprises:
   a magnetic core element separated from the armature member by a first gap when the solenoid is de-energized, the check valve member being separated from the armature member by a second gap when the solenoid is de-energized, the first gap being larager than the second gap.

6. The invention of claim 5, wherein:
in response to energization of the solenoid, the check valve moves away from the second seat to communicate the chamber with the second passage before the valve member moves away from the first seat.

7. The invention of claim 4, wherein:
the check valve has cylindrical body slidably received by a portion of the valve member, the body having a groove in a surface thereof for communicating fluid between the check valve body and the valve member.

8. The invention of claim 7, wherein:
the check valve has an axially extending projection which is received by the second passage and for sealing engagement with the second seat.

* * * * *

UNITED STATES PATENT AND TRADEMARK OFFICE
CERTIFICATE OF CORRECTION

PATENT NO. : 4,494,726

DATED : 22 January 1985

INVENTOR(S) : Viraraghavan Sampath Kumar et al

It is certified that error appears in the above-identified patent and that said Letters Patent is hereby corrected as shown below:

Column 3, line 18, after "one", insert -- end --.
Column 4, line 43, after "has", insert -- a --.

Signed and Sealed this

Twenty-first Day of January 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,494,726

DATED : Jan. 22, 1985

INVENTOR(S) : Viraraghavan S. Kumar and Rohn L. Olson

It is certified that error appears in the above-identified patent and that said Letters Patent is hereby corrected as shown below:

Column 4, line 36, delete "larager" and insert --larger--.

Signed and Sealed this

Eleventh Day of March 1986

[SEAL]

Attest:

DONALD J. QUIGG

Attesting Officer

Commissioner of Patents and Trademarks